(12) United States Patent
Grant

(10) Patent No.: US 11,755,772 B2
(45) Date of Patent: Sep. 12, 2023

(54) SECURING DATA IN A BLOCKCHAIN WITH A ONE-TIME PAD

(71) Applicant: Crown Sterling Limited, LLC, Newport Beach, CA (US)

(72) Inventor: Robert Edward Grant, Laguna Beach, CA (US)

(73) Assignee: Crown Sterling Limited, LLC, Newport Beach, CA (US)

( * ) Notice: Subject to any disclaimer, the term of this patent is extended or adjusted under 35 U.S.C. 154(b) by 157 days.

(21) Appl. No.: 17/479,632

(22) Filed: Sep. 20, 2021

(65) Prior Publication Data
US 2023/0088104 A1    Mar. 23, 2023

(51) Int. Cl.
H04L 29/06     (2006.01)
G06F 21/62     (2013.01)
H04L 9/08      (2006.01)
H04L 9/06      (2006.01)
H04L 9/00      (2022.01)

(52) U.S. Cl.
CPC ........ *G06F 21/6245* (2013.01); *H04L 9/0656* (2013.01); *H04L 9/0861* (2013.01); *H04L 9/50* (2022.05)

(58) Field of Classification Search
None
See application file for complete search history.

(56) References Cited

U.S. PATENT DOCUMENTS

| 5,033,352 | A  | 7/1991  | Kellogg   |
| 5,764,772 | A  | 6/1998  | Kaufman   |
| 5,966,445 | A  | 10/1999 | Park      |
| 6,072,876 | A  | 6/2000  | Obata     |
| 6,154,541 | A  | 11/2000 | Zhang     |
| 6,396,928 | B1 | 5/2002  | Zheng     |
| 6,480,605 | B1 | 11/2002 | Uchiyama  |
| 6,636,968 | B1 | 10/2003 | Rosner    |
| 6,751,736 | B1 | 6/2004  | Bowman    |

(Continued)

FOREIGN PATENT DOCUMENTS

| EP | 1220174 | 7/2002 |
| EP | 2680488 | 8/2019 |

(Continued)

OTHER PUBLICATIONS

Ahmadi-Assalemi, Gabriela et al. Federated Blockchain-Based Tracking and Liability Attribution Framework for Employees and Cyber-Physical Objects in a Smart Workplace. 2019 IEEE 12th ICGS3. https://ieeexplore.ieee.org/stamp/stamp.jsp?tp=&arnumber= 8688297 (Year: 2019).*

(Continued)

*Primary Examiner* — Jeremiah L Avery

(74) *Attorney, Agent, or Firm* — Fish IP Law, LLP

(57) ABSTRACT

A system that generates a blockchain for a user wherein each block in the chain contains encrypted information associated with the user. The information in each block is encrypted and decrypted by a key that is generated based on a function, a starting point and a length that is shared with participants that have access to the data in each block. The access can be controlled with granularity by the owner of the information without having cumbersome passkey management.

17 Claims, 6 Drawing Sheets

(56) References Cited

U.S. PATENT DOCUMENTS

| | | | |
|---|---|---|---|
| 6,763,364 | B1 | 7/2004 | Wilber |
| 6,990,200 | B1 | 1/2006 | Kasahara |
| 7,502,754 | B2 | 3/2009 | Campbell |
| 8,468,244 | B2 | 6/2013 | Redlich et al. |
| 8,516,244 | B2 | 8/2013 | Waters |
| 8,885,820 | B1 | 11/2014 | Lambert et al. |
| 9,450,749 | B2 | 9/2016 | Hammersmith |
| 10,230,703 | B1 | 3/2019 | Lepore |
| 10,476,665 | B1 | 11/2019 | Griffin |
| 10,911,451 | B2 | 2/2021 | Costa |
| 11,080,665 | B1* | 8/2021 | Poelstra ................ H04L 9/3013 |
| 11,139,955 | B1* | 10/2021 | So ..................... G06Q 20/3674 |
| 11,188,977 | B2 | 11/2021 | Youb |
| 11,443,310 | B2 | 9/2022 | Bolla |
| 11,522,700 | B1* | 12/2022 | Auerbach ............. H04L 9/3213 |
| 2003/0081785 | A1 | 5/2003 | Boneh |
| 2003/0115449 | A1 | 6/2003 | Yochim |
| 2004/0096056 | A1 | 5/2004 | Boren |
| 2006/0072745 | A1 | 4/2006 | Fukaya |
| 2007/0211893 | A1 | 9/2007 | Frosik |
| 2008/0107274 | A1 | 5/2008 | Worthy |
| 2008/0208560 | A1 | 8/2008 | Johnson |
| 2010/0119061 | A1 | 5/2010 | Kawale |
| 2012/0134495 | A1 | 5/2012 | Liu |
| 2013/0142323 | A1 | 6/2013 | Chiarella |
| 2013/0297937 | A1 | 11/2013 | Fransen |
| 2014/0112469 | A1 | 4/2014 | Layne |
| 2016/0012252 | A1 | 1/2016 | Deleeuw |
| 2017/0222804 | A1 | 8/2017 | Dewitt |
| 2017/0302446 | A1 | 10/2017 | Thorwirth |
| 2017/0310650 | A1 | 10/2017 | McMullen |
| 2018/0039667 | A1* | 2/2018 | Pierce ................... H04L 9/3247 |
| 2018/0101322 | A1 | 4/2018 | Cheriton |
| 2018/0131526 | A1 | 5/2018 | Ellingson |
| 2019/0036678 | A1 | 1/2019 | Ahmed |
| 2019/0089532 | A1 | 3/2019 | Lambert |
| 2019/0120929 | A1 | 4/2019 | Meadow |
| 2019/0173677 | A1* | 6/2019 | Christmas ............. H04L 9/0897 |
| 2019/0238323 | A1 | 8/2019 | Bunch |
| 2020/0084037 | A1 | 3/2020 | Zhang |
| 2020/0177579 | A1* | 6/2020 | Allen .................... H04L 63/123 |
| 2020/0241841 | A1 | 7/2020 | Tamiya |
| 2020/0293212 | A1 | 9/2020 | Narayanamurthy |
| 2020/0366652 | A1 | 11/2020 | Koyun |
| 2020/0396059 | A1 | 12/2020 | Micali |
| 2022/0198034 | A1* | 6/2022 | Rodriguez ............. G06F 21/78 |
| 2023/0007439 | A1 | 1/2023 | Williams |

FOREIGN PATENT DOCUMENTS

| | | |
|---|---|---|
| JP | 2007157288 | 6/2007 |
| WO | 0065768 | 11/2000 |
| WO | 2005085992 | 9/2005 |
| WO | 2016203762 | 12/2016 |
| WO | 2019110955 | 6/2019 |

OTHER PUBLICATIONS

Viriyasitavat, Wattana et al. Blockchain Technology for Applications in Internet of Things—Mapping From System Design Perspective. IEEE Internet of Things Journal, vol. 6, Issue: 5. https://ieeexplore.ieee.org/stamp/stamp.jsp?tp=&arnumber=8752029 (Year: 2019).*

Wu, Guangfu; Wang, Yingjun. The security and privacy of blockchain-enabled EMR storage management scheme. 2020 16th International Conference on Computational Intelligence and Security (CIS). https://ieeexplore.ieee.org/stamp/stamp.jsp?tp=& arnumber=9407466 (Year: 2020).*

K.N., Devika; Bhakthavatchalu, Ramesh. Parameterizable FPGA Implementation of SHA-256 using Blockchain Concept. 2019 International Conference on Communication and Signal Processing (ICCSP). https://ieeexplore.ieee.org/stamp/stamp.jsp?tp=& arnumber=8698069 (Year: 2019).*

International Search Report dated Jan. 18, 2023, from related PCT application No. PCT/US2022/043866. 9 pages.

Bhaumik, et al. "Safely Doubling your Block Ciphers for a Post-Quantum World," Inria, Paris. 2020. 49 pages.

"Elliptic Curve Cryptography (Ecc)." 1 page, 2022.

"Elliptic Curve Over Finite Non-Prime Fields," Mathematics. 2 pages, 2020.

"Golden Ratio Calculator," Good Calculators. 2 pages, 2022.

Grant, et al. "Accurate and Infinite Prime Prediction from Novel Quasi-Prime Analytical Methodology." 8 pages, 2019.

Grant, Robert E. "Prime Number Pattern Discovery," Discoveries, Publications, Unified Math/Physics. Jul. 2018. 6 pages.

Kumar, et al. "A Symmetric Mecial Image Encryption Scheme Based on Irrational Numbers," Biomed Res 2018 Special Issue S494-S498. 5 pages.

Grant, et al. "Reciprocal Wave Factorization," Strathspey Crown Holdings. Jun. 2020. 19 pages.

Barker, et al. "Recommendation for Pair-Wise Key Establishment Schemes Using Discrete Logarithm Cryptography," NIST. Apr. 2018. 2 pages.

Weisstein, Eric W. "Taniyama-Shimura Conjecture," Mathworld—A Wolfram Web Resource. 3 pages, 2022.

Wang, et al. "A Decentralized Electricity Transaction Mode of Microgrid Based on Blockchain and Continuous Double Action," IEEE 2018. 5 pages.

"Why Are Elliptic Curves Constructed Using Prime Fields and Not Composite Fields?" https://crypto.stackexchange.com. 3 pages, 2017.

"Why is a Prime Number Used in ECDSA?" https://crypto.stackexchange.com/. 3 pages, 2020.

Wu, et al. "Forensic Analysis of Bitcoin Transactions," IEEE. 2019. 3 pages.

Burd, Barry. "A New Approach to Condensing Data Leads to a 99% Compression Rate," TechTarget. May 2015. 9 pages.

Zhang, et al. "A Blockchain-Based Authentication Method with One-Time Password," IEEE, 2019. 9 pages.

* cited by examiner

SECURING DATA IN A BLOCKCHAIN WITH A ONE-TIME PAD

FIELD OF THE INVENTION

The field of the invention is data security.

BACKGROUND

The background description includes information that may be useful in understanding the present invention. It is not an admission that any of the information provided herein is prior art or relevant to the presently claimed invention, or that any publication specifically or implicitly referenced is prior art.

The popularity of cryptocurrencies in recent years has inspired many to seek other potential uses for blockchain for other applications. Private blockchains allow for the storage of sensitive information. However, access management for this information is cumbersome, especially as the blockchains get bigger and bigger.

For shared data sets such as in a blockchain system, a system must be able to secure the data while being flexible enough to allow users proper access to the data. Unfortunately, this creates complexity where the system must juggle many separate keys for all users, and be constantly updating each.

One-time pads for passwords are known to be have a high level of security. However, the use of one-time pads requires that the keys be shared between the parties ahead of time, and only be used once. This means that for many exchanges, the parties must have a priori storage of many keys. The difficulties associated with these requirements has resulted in favoring the public key cryptography schemes over one-time pad schemes.

Others have attempted to solve this problem.

WO 20190110955 to Bryant discusses the use of a one-time pad for password generation. However, the solution in Bryant requires the storage of all of the passwords in a large pad, which is resource intensive.

WO 00/65768 to Persson discusses determining a maximum key length. However, the generation of the shortened key in Persson is performed in such a way that a function can still only be used once.

Thus, there is still a need for a system that securely protects a shared data set while adeptly providing the correct access to its users.

SUMMARY OF THE INVENTION

The inventive subject matter provides apparatus, systems and methods in which a computing device selects a mathematical function to correspond to a user, derives a raw key from the function.

The computing device then uses the raw key to generate a first block in a blockchain by first applying a start position and length to the decimals of the raw key. Then, the computing device encrypts a first datum or data set with the first key and generates a block containing the encrypted first data set, which is used to start a blockchain or is added to an existing blockchain.

The computing device generates a block for a second datum or set of data by applying a second start position and length to the decimals of the raw key to generate a second key. The computing device encrypts the second datum/data set with the second key and generates a second block containing the encrypted second datum/data set, which is then added to the blockchain.

To enable another party to decrypt one of the blocks, the computing device provides the function and the start position and length corresponding to the block that the second party (via a second computing device) is authorized to access. The second computing device can then generate a corresponding decryption key to access only that block.

In embodiments of the inventive subject matter, the function obtained by the computing device can be selected and obtained from a database containing a plurality of suitable functions.

In embodiments of the inventive subject matter, each of the encrypted data sets stored in respective blocks within the blockchain correspond to different types of information associated with the user. For example, if the user is a human user, the blocks can each be a different type of personal information. In a variation of these examples, the first block (or first few blocks) can include personal information, and subsequent blocks can store information such as financial information, medical records information, a government record associated with the person, etc.

In at least some embodiments, the data in a particular block within a blockchain can include some or all of the data one or more of the prior blocks in the chain. This way, a user can allow access to more or less information by simply selecting which specific block to authorize for access.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
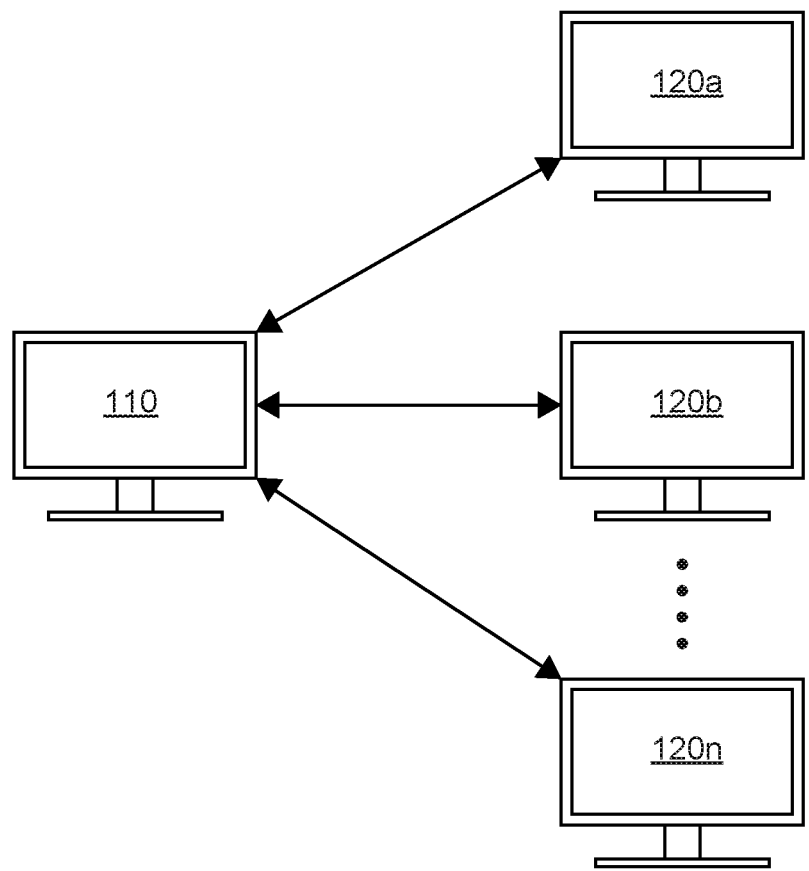
FIG. 1 is a diagrammatic overview of a system according to various embodiments of the inventive subject matter.

FIG. 1 provides a diagrammatic overview of a system 100 according to embodiments of the inventive subject matter.

As seen in FIG. 1, the system includes a computing device 110. Computing device 110 is represented as a single computing device in FIG. 1, but could be a group of computing devices working together to execute the processes of the inventive subject matter.

The computing device 110 could be considered to be the user's computing device that controls access to the blockchain as discussed herein.

Computing devices 120a through 120n are connected to computing device 110 through a data exchange network (e.g., the Internet, etc.). These computing devices 120a to 120n represent computing devices that are operated by different entities that can access and, in some cases, contribute to the blockchain as discussed herein.

The computing devices 110 and 120a-120n can include a processor that executes the instructions of the inventive subject matter, a memory (e.g., RAM, ROM, etc.) that stores instructions and other data associated with the inventive subject matter, and a data exchange interface (e.g., Wi-Fi, wired connection, cellular, etc.).

Figure 2:
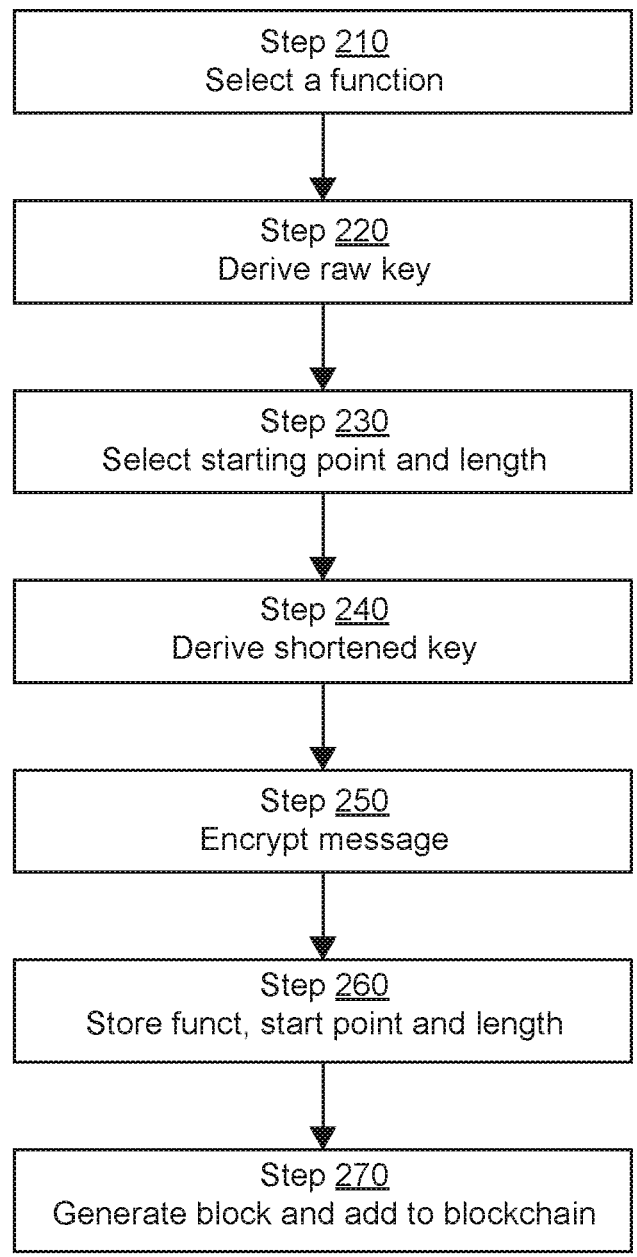
FIG. 2 is a flowchart of the processes executed by the system to generate a block with encrypted data for a blockchain, according to various embodiments of the inventive subject matter.

FIG. 2 is a flowchart of the processes executed by computing device 110 to generate a block with encrypted data for a blockchain, according to embodiments of the inventive subject matter.

At step 210, the computing device 110 selects a mathematical function to be used to obtain a raw key. The function can be a mathematical function or algorithm as discussed further herein, in embodiments where multiple mathematical functions are stored. The function can be selected according to a pre-determined order or schedule. Alternatively, it can be randomly selected or user selected. The computing device 110 obtains the selected function from the stored functions in a memory, such as from a dedicated functions database.

At step 220, the computing device 110 solves the function to obtain a raw key. The raw key is either an irrational number or a transcendental number, having an infinite or near-infinite amount of decimal places. Thus, the function is a function whose output is an irrational number and/or a transcendental number. By using an irrational or transcendental number, the systems and methods of the inventive subject matter have the flexibility to obtain many encryption keys from the same function without repeating some or all of the encryption keys. Because irrational numbers do not have a pattern, the systems and methods of the inventive subject matter can ensure true randomness in the generation of cryptography keys. For example, the function can be to take the square root of a non-perfect square number. This results in an irrational number. In an illustrative example, the function to be solved can be the square root of 20.

At step 230, the computing device 110 selects a starting point and a length. The starting point designates a start digit in the decimals of the raw key. The length designates the number of digits following the start digit. The start digit and length are preferably integer values such that they identify a precise digit location and precise length.

At step 240, the computing device 110 applies the starting point and length to the decimals of the raw key to result in a shortened key. Thus, the shortened key is a key that starts at the start digit and contains the digits following the start digit according to the length.

Figure 3:
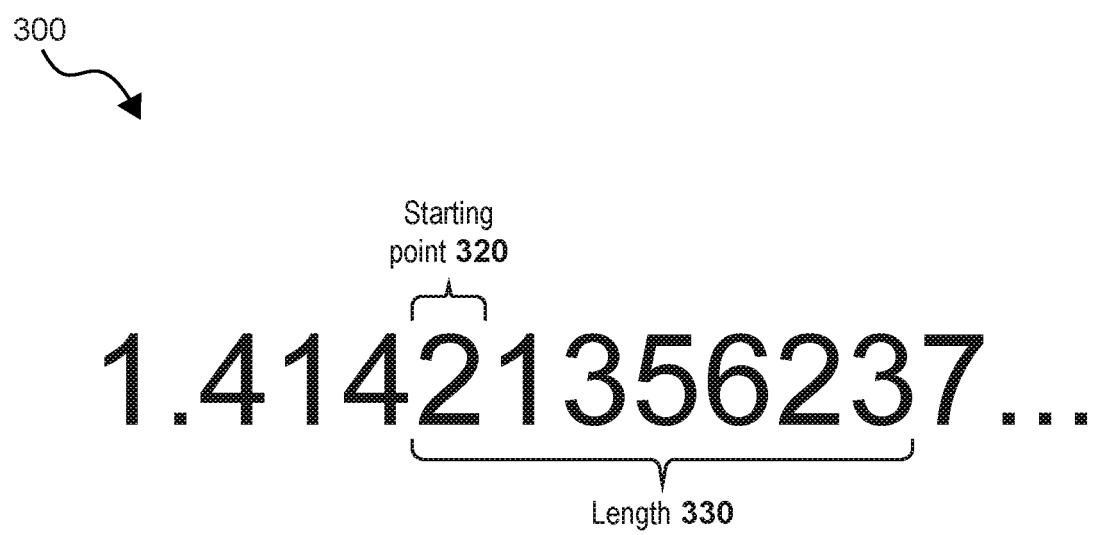
FIG. 3 provides a simplified illustrative example of the starting point and length applied to a raw key to generate the shortened key, according to embodiments of the inventive subject matter.

FIG. 3 provides a simplified illustrative example of the starting point and length applied to a raw key to generate the shortened key. The example of FIG. 3 includes a raw key 300 (in this simplified example, the square root of 2). The starting point 320 of "4" means the start digit is the fourth digit in the decimals of the raw key. In this, example, the starting point 320 of "4" means that the start digit is "2". The length 330, in this case of 7 characters, designates the length of the shortened key. Thus, in this case, the shortened key is "2135623". It should be noted that the starting point and length of FIG. 3 are for illustrative purposes only. The starting point can be any point along the decimals of the raw key and the length of any suitable length. The length can correspond to the length of the data to be encrypted, in certain embodiments.

At step 250, the computing device 110 encrypt the data set or portion with the generated shortened key. The shortened keys are the keys used for encryption and decryption.

At step 260, the computing device 110 then can store the selected function (or a designator of the selected function), the starting point and length in a memory for future reference. It should be noted that, because the computing device 110 stores the function/designation of the function, the starting point, and length for this particular set of data being encrypted, it is not necessary to store the raw key or the generated shortened key. As such, these keys can be deleted after use.

The techniques used to generate and use the encryption/decryption keys using a single, shared mathematical function are described in greater detail in the inventor's own pending U.S. patent application U.S. Ser. No. 17/018,582 filed Sep. 11, 2020, entitled "Method of Storing and Distributing Large Keys", which is incorporated herein by reference in its entirety.

At step 270, the computing device generates a block that contains the encrypted first data and either adds it to an existing blockchain or uses it to begin a new blockchain.

To generate additional, subsequent blocks for the blockchain that will contain additional data sets associated with the user, the computing device 110 repeats the steps of FIG. 2 but with a different starting point and, optionally, a different length. By performing these steps for each new set of data that is to be included will be encrypted such that the user can simply and effectively manage access to the data within the individual blocks without having to keep track of a large number of different passwords or store a large number of keys.

In order for authorized users to be able to access their respective authorized data sets within blocks of the blockchain, the computing device 110 first distributes the mathematical function to those computing devices 120. This can be done at a time prior or simultaneous with the authorization to access the data set in a particular block.

Then, the computing device 110 transmits the start location and length information for the key for that particular block to the authorized computing device. This can be performed simultaneously with the transmission of the function but is preferably performed separately (in a separate message at the same time or temporally separate). Along with the start location and length information, the computing device 110 transmits the identification of the block containing the information the receiving computing device is authorized to access. As with the prior communications, the transmission of the block identification can be performed together with or separately from one or more of the other communications.

Figure 4:
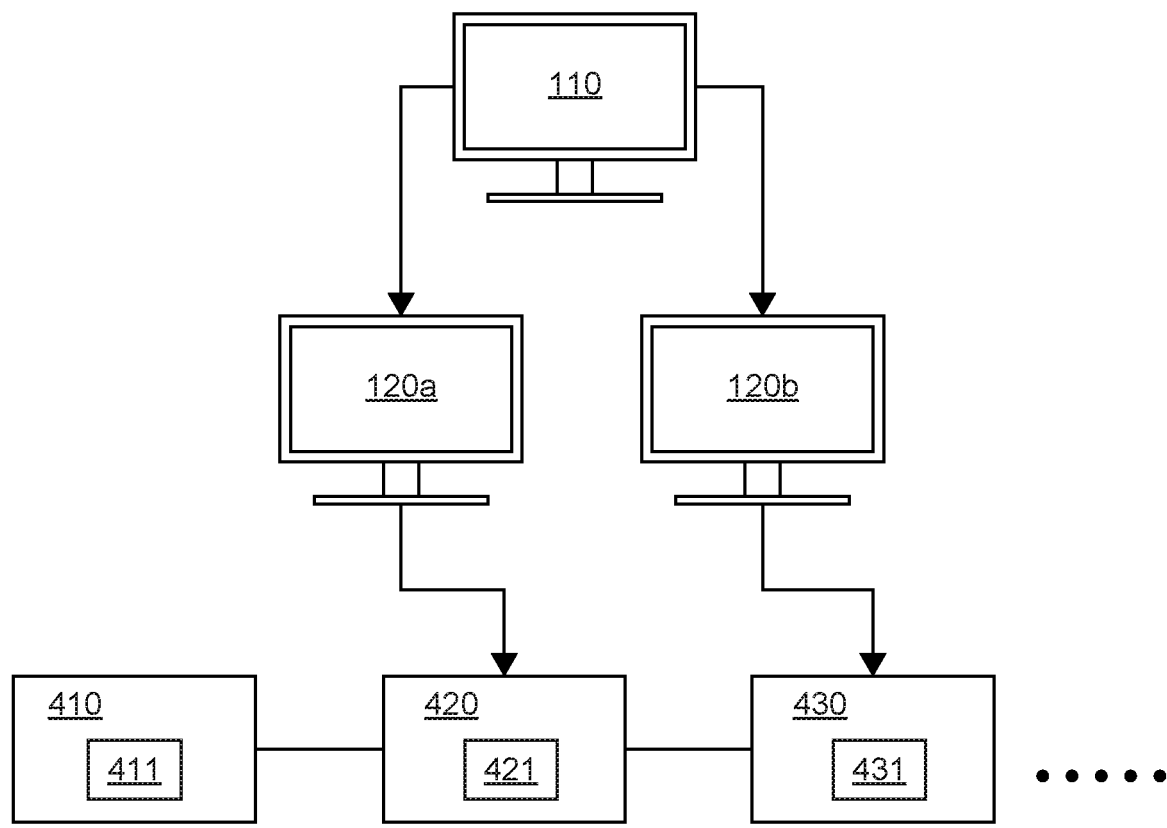
FIG. 4 depicts a blockchain that contains blocks, each with their respective encrypted data sets, according to various embodiments of the inventive subject matter.

An example of this is shown in FIG. 4. FIG. 4 depicts a blockchain 400 that contains blocks 410, 420 and 430, each with their respective encrypted data sets 411, 421, 431. Computing device 110 has authorized computing device 120a to access data set 421 and computing device 120b to access data set 431. As discussed herein, a user can be a person, a company, an organization, or other entity.

To enable computing device 120a to access the encrypted data set 421, the computing device 110 transmits the identification of block 420, as well as the function, the start position and length used to generate the key used to encrypt data set 421 to the computing device 120a. As discussed above, these items of information can be transmitted together or separately.

Similarly, to enable computing device 120b to access the encrypted data set 431, the computing device 110 transmits the identification of block 430, as well as the function, the start position and length used to generate the key used to encrypt data set 431 to the computing device 120b.

To decrypt the encrypted data within a block, the computing devices 120a and 120b accessing the data performs the steps 220-240 of FIG. 2 and then uses their respective generated shortened key to decrypt the data sets.

In embodiments, the entire blockchain can correspond to a particular category of information. For example, for a human user, a particular blockchain can correspond to medical history information. In this example, each block can correspond to a particular part of the user's medical history (e.g., each block can correspond to a medical procedure, a prescription, a check-up, a doctor's office visit, a hospital stay, an update to the medical status of the user, etc.).

For example, applying this to the blockchain of FIG. 4, the encrypted data set 421 could be lab results and computing device 120*a* could be a computing device operated by a doctor's office that is to analyze the lab results whereas encrypted data set 431 could be dental records and computing device 120*b* could be a dentist's computing device that is going to view the records for the next visit.

Thus, in these embodiments, a user can have multiple, separate blockchains (e.g., one for medical records information, another for financial information, another for government records information, etc.).

In this example, the initial block or blocks in a blockchain can contain basic information (encrypted) about the user. For example, in FIG. 4, encrypted data set 411 of block 410 could include information such as a user's name, birthdate, and other basic information typically used in the industry or practice reflected in the data stored within the blockchain.

In embodiments, the subsequent blocks of a blockchain can include some of the information of the data set of one or more prior blocks in the chain. For example, block 421 could include some or all of the information of block 411 such that when decrypting, computing device 120*a* can obtain all of the necessary information without having to decrypt data set 411. This also enables the user of computer device 110 to control which basic information to disclose to which party by including only that particular information within the block that the third party will be authorized to access.

In certain situations, a third party (such as the operator of computing device 120*a* or 120*b*) may have to modify or add information to a user's blockchain. In these situations, the third party operator can generate a new block with a new encrypted data set and add it to the blockchain 400.

In these situation, the third party computing device (for example, computing device 120*a*) uses the provided function, length and starting point to generate a shortened key as discussed in the steps 220-240, encrypts the new data set as in step 250 and adds it to the blockchain as in step 270 of FIG. 2. If the computing device 120*a* does not yet have a function, length or starting point, it can request one from computing device 110.

Figure 5:
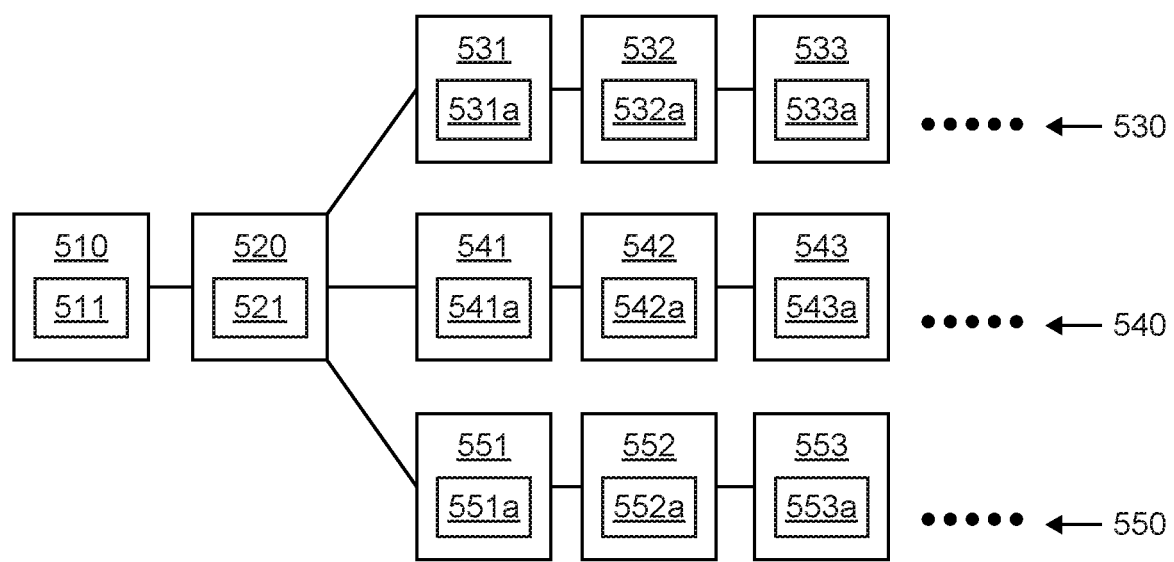
FIG. 5 shows a branching blockchain including several types of information, according to various embodiments of the inventive subject matter.

In a variation of these embodiments, the initial block or blocks in a user's blockchain can be used to store encrypted personal/basic information of the user (e.g., for a human user: a name, birthdate, social security number, etc.). After the initial blocks, the user can then have individual blockchains branching off the initial blocks with specific types of information. FIG. 5 illustrates these embodiments of the inventive subject matter.

As seen in FIG. 5, initial blocks 510 and 520 store basic information 511, 521, respectively (in encrypted form, as discussed throughout) about the user. The basic information can include items of information about the user that are typically used across different facets of a user's existence. For a person, this can be basic information such as name, birthdate, social security number, etc.

The individual blockchains 530, 540, 550 branch off the basic information blocks, building off of the second block 520. Blockchain 530 includes blocks 531, 532, 533 storing encrypted data sets 531*a*, 532*a* and 533*a*, respectively. Likewise, blockchain 540 includes blocks 541, 542, 543 with respective encrypted data sets 541*a*, 542*a*, 543*a* and blockchain 550 includes blocks 551, 552, 553 with respective encrypted data sets 551*a*, 552*a*, 553*a*.

Each of these individual blockchains 530, 540, 550 could correspond to a different aspect of a user's existence.

For example, blockchain 530 could correspond to a user's medical records, with each of the blocks 531-533 storing data sets 531*a*-533*a* corresponding to a different event or aspect of a user's medical record history (e.g., lab results, exam results, prescriptions, diagnosis, doctor visits, etc.).

In this example, blockchain 540 could correspond to financial records. Thus, each of the blocks 541-543 would store respective data sets 541*a*-543*a* that correspond to a different event or aspect of a user's financial record history (e.g., deposits, withdrawals, investments, income information, property records, etc.).

Blockchain 550 could, in turn, correspond to government records information. Thus, each of the blocks 551-553 would store respective data sets 551*a*-553*a* that correspond to a different government record (e.g., driver's license records, tax records, etc.)

In embodiments, a single function can be used to generate all of the encryption keys for the initial blocks 510 and 520, as well as all of the blocks of blockchains 530, 540 and 550. In these embodiments, different starting points and (optionally) different lengths are used to generate unique keys for each block in each of the blockchains.

In other embodiments, different functions can be used for the initial block set (blocks 510, 520), for blockchain 530, for blockchain 540 and for blockchain 550. In these embodiments, the computing device 110 would have to provide multiple functions (and corresponding start points and lengths) to third party computing devices if they are granting access to the initial blocks 510, 520 as well as one or more blocks within a particular blockchain 530, 540 or 550.

Figure 6:
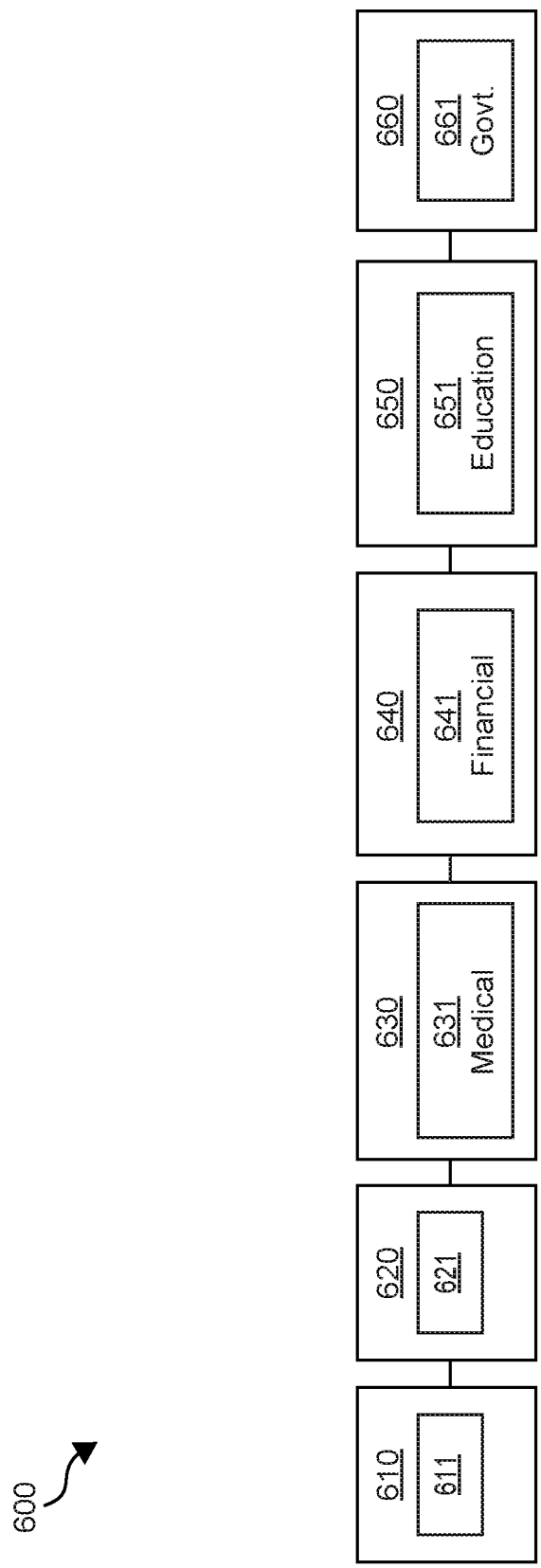
FIG. 6 shows a blockchain associated with a user including multiple types of information, according to various embodiments of the inventive subject matter.

In embodiments, a single blockchain for a user can include multiple types of information as part of the chain. For example, for a human user, some blocks in the blockchain can contain medical records information, others financial information, other personal information, etc.). In these embodiments, the user has one blockchain for multiple types of records/information. FIG. 6 illustrates these embodiments. As seen in FIG. 6, the blockchain 600 includes initial blocks 610 and 620, which contain encrypted data sets 611, 612, respectively, that correspond to basic information about the user (such as the basic information discussed herein).

Following blocks 610 and 620, the blockchain 600 includes blocks 630-660 with respective encrypted data sets 631-661. As seen in FIG. 6, the encrypted data sets in the blockchain 600 are of different types. Data set 631 corresponds to medical information, data set 641 is financial information, data set 651 corresponds to education information (e.g., transcripts, student records, etc.), and data set 661 corresponds to government information.

In the embodiment of FIG. 6, other parties that are given access to view, change or update data could create new blocks and would all add these new blocks to the same blockchain 600

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of securing personal data of a user within a blockchain, comprising:
obtaining, by a computing device, a function for the user;
deriving, by the computing device, a raw key from the function;
generating a first block in a blockchain by:
applying, by the computing device a first start position and first length to decimals of the raw key to derive a first key, wherein the first key comprises a first portion of the decimals starting at the first start position within the decimals and that is of a length equal to the first length within the decimals of the raw key;
encrypting, by the computing device, a first data with the first key; and
generating, by the computing device, a first block that contains the encrypted first data;
generating a second block in a blockchain by:
applying, by the computing device, a second start position and second length to the decimals of the raw key to derive a second key, wherein the second key comprises a second portion of the decimals starting at the second start position within the decimals and that is of a length equal to the second length within the decimals of the raw key;
encrypting, by the computing device, a second data with the second key; and
generating, by the computing device, a second block that contains the encrypted second data; and
generating, by the computing device, the blockchain with the first block and second block.

2. The method of claim 1, further comprising:
providing, by the computing device, the function and the first start position and first length to a second computing device;
deriving, by the second computing device, a second raw key from the function;
applying the first start position and first length to the second raw key to derive a decryption key, wherein the decryption key comprises the first portion of the decimals starting at the first start position within the decimals and that is of a length equal to the first length within the decimals of the second raw key; and
decrypting the first data with the decryption key.

3. The method of claim 1, wherein the step of obtaining the function comprises:
obtaining, by the computing device, the function from a database storing a plurality of functions.

4. The method of claim 1, further comprising where the first length and second length are equal.

5. The method of claim 1, wherein the first data is a first item of personal information and the second data is a second item of personal information.

6. The method of claim 1, wherein each of the first data and the second data comprises at least one of personal information about the user, a medical record of the user, a financial record of the user, or a government record of a user.

7. The method of claim 1, wherein the second data can include at least part of the first data.

8. The method of claim 1, further comprising:
generating a third block in the blockchain by:
applying, by the computing device a third start position and third length to the decimals of the raw key to derive a third key, wherein the third key comprises a third portion of the decimals starting at the third start position within the decimals and that is of a length equal to the third length within the decimals of the raw key;
encrypting, by the computing device, a third data with the third key;
generating, by the computing device, a third block that contains the encrypted third data; and
adding, by the computing device, the third block to the blockchain;
wherein the first data comprises a first type of data associated with the user, the second data comprises a second type of data associated with the user and the third data comprises a third type of data associated with the user.

9. A method of securing data of a user within a blockchain, comprising:
obtaining a function for the user;
deriving a raw key from the function; and
for each of a plurality of user data sets associated with the user, generating a corresponding block in a blockchain by:
applying a start position and length to decimals of the raw key to derive a key;
encrypting the user data set with the key, wherein the key comprises a portion of the decimals starting at the start position within the decimals and that is of a length equal to the length within the decimals of the raw key; and
generating the block that contains the encrypted data;
wherein the start position for each of the plurality of user data sets is different.

10. A system comprising a non-transitory computer-readable storage medium storing instructions that, when executed by a processor, cause the processor to:
obtain a function for the user;
derive a raw key from the function;
generate a first block in a blockchain by:
applying a first start position and first length to decimals of the raw key to derive a first key, wherein the first key comprises a first portion of the decimals starting at the first start position within the decimals and that is of a length equal to the first length within the decimals of the raw key;
encrypting a first data with the first key; and
generating a first block that contains the encrypted first data;
generate a second block in a blockchain by:
applying a second start position and second length to the decimals of the raw key to derive a second key, wherein the second key comprises a second portion of the decimals starting at the second start position within the decimals and that is of a length equal to the second length within the decimals of the raw key;
encrypting a second data with the second key; and
generating a second block that contains the encrypted second data; and
generating the blockchain with the first block and second block.

11. The system of claim 10, further comprising instructions that, when executed by the processor, cause the processor to:
provide the function, the first start position the first length to a computing device;

the computing device programmed to:
  derive a second raw key from the function;
  apply the first start position and first length to the second raw key to derive a decryption key, wherein the decryption key comprises the first portion of the decimals starting at the first start position within the decimals and that is of a length equal to the first length within the decimals of the second raw key; and
  decrypt the first data with the decryption key.

12. The system of claim 10, wherein the step of obtaining the function comprises instructions that, when executed by the processor, cause the processor to obtain the function from a database storing a plurality of functions.

13. The system of claim 10, further comprising where the first length and second length are equal.

14. The system of claim 10, wherein the first data is a first item of personal information and the second data is a second item of personal information.

15. The system of claim 10, wherein each of the first data and the second data comprises at least one of personal information about the user, a medical record of the user, a financial record of the user, or a government record of a user.

16. The system of claim 10, wherein the second data can include at least part of the first data.

17. The system of claim 10, further comprising instructions that, when executed by the processor, cause the processor to:
  generate a third block in the blockchain by:
    applying a third start position and third length to the decimals of the raw key to derive a third key, wherein the third key comprises a third portion of the decimals starting at the third start position within the decimals and that is of a length equal to the third length within the decimals of the raw key;
    encrypting a third data with the third key;
    generating a third block that contains the encrypted third data; and
    adding the third block to the blockchain;
  wherein the first data comprises a first type of data associated with the user, the second data comprises a second type of data associated with the user and the third data comprises a third type of data associated with the user.

* * * * *